United States Patent [19]

Kishimoto et al.

[11] Patent Number: 4,673,714

[45] Date of Patent: Jun. 16, 1987

[54] OLEFIN HYDROGENATION CATALYST, PROCESS FOR HYDROGENATING POLYMERS WITH THE CATALYST, AND HYDROGENATED BLOCK COPOLYMERS PRODUCED BY SAID PROCESSES

[75] Inventors: Yasushi Kishimoto, Ayase; Tetsuo Masubuchi, Kawasaki, both of Japan

[73] Assignee: Asahi Kasei Kogyo Kabushiki Kaisha, Osaka, Japan

[21] Appl. No.: 721,701

[22] Filed: Apr. 10, 1985

[30] Foreign Application Priority Data

Apr. 18, 1984 [JP] Japan ................................. 59-76614

[51] Int. Cl.[4] .............................................. C08F 8/04
[52] U.S. Cl. .................................... 525/314; 525/338; 585/271; 585/275
[58] Field of Search ................ 525/338, 314; 585/271, 585/275

[56] References Cited

U.S. PATENT DOCUMENTS 3,333,024  7/1967  Haefele et al. .
3,431,323  3/1969  Jones .
3,595,942  7/1971  Wald et al. .
3,700,748  10/1972 Winkler .
4,501,857  2/1985  Kishimoto et al. ................. 525/338

OTHER PUBLICATIONS

Spontaneous H-D Exchange in Hydrogenated 1-Methylallylidyclopentadienyltitanium (III)—an Active Acatlyst for the Isomerization and Hydrogenation of Unsaturated Hydrocarbons, Martin et al., Unilever Research Laboratory, 1969, p. 1366.
Nature of the Activity and the Kinetics of Cyclohexene Hydrogenation by the Catalystic System $(C_5H_5)_2TiCl_2$—$LiC_4H_9$ Shmidt et al, Zhadanov University, Reaction Kinetics and Catalysts Letters, vol. 5, No. 2. pp. 101-106, (1976).
Hydrogenation of Conjugated Biolefins with Transition Metal Complexes, Y. Tajima et al, Central Research Laboratories, Journal of American Chemistry Society, 1967.
Photocatalytic Homogeneous Hydrogenation of Olegins with Alkyltitanocene Compounds, Edmund Samuel, pp. C65-C68, 1980.
Hydrido Complexes of Zirconium IV, Reactions with Olefin, P. C. Wailes et al, C.S.I.R.O. Division of Applied Chemistry, pp. C32-C34, 1972.
H. Clauss, H. Bestian, Ann. Chemistry, 654, pp. 8-19, (1962).
Journal of the Chemical Society of Japan, Industrial Chemistry Section, 68(2), 358, (1965).

*Primary Examiner*—Wilbert J. Briggs, Sr.
*Attorney, Agent, or Firm*—Birch, Stewart, Kolasch & Birch

[57] ABSTRACT

An olefin hydrogenation catalyst containing as an essential component a compound represented by the formula:

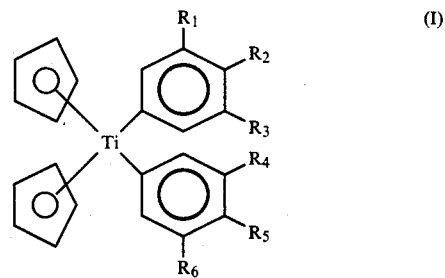

(I)

The catalyst is capable of selectively hydrogenating the unsaturated double bonds of the diene units of a conjugated diene polymer or copolymer having a number average molecular weight of 500 to 1,000,000, particularly a styrenebutadiene block copolymer comprising at least one polymer block A composed mainly of styrene and at least one polymer block B composed mainly of 1,3-butadiene and/or isoprene. The hydrogenated block copolymer obtained from such selective hydrogenation is useful as an elastomer, a thermoplastic elastomer or a thermoplastic resin having excellent weather resistance and oxidation resistance.

9 Claims, No Drawings

OLEFIN HYDROGENATION CATALYST, PROCESS FOR HYDROGENATING POLYMERS WITH THE CATALYST, AND HYDROGENATED BLOCK COPOLYMERS PRODUCED BY SAID PROCESSES

BACKGROUND OF THE INVENTION

This invention relates to a novel hydrogenation catalyst which is stable in air at room temperature and has a high activity even in the absence of a reducing metal compound, to a process for hydrogenating a conjugated diene polymer with this hydrogenation catalyst and to a hydrogenated polymer obtained by the hydrogenation process. More particularly, this invention relates to a titanocene diaryl compound as a hydrogenation catalyst, to a process for preferentially hydrogenating the unsaturated double bonds of the conjugated diene units of a conjugated diene polymer with this compound under mild hydrogenation conditions and to a hydrogenated, conjugated diene-styrene block copolymer produced by this process which is a useful thermoplastic elastomer.

For the hydrogenation of compounds having olefinically unsaturated double bonds various catalysts are known. There are generally two types of hydrogenation catalysts, namely, (1) heterogeneous system catalysts of the carrier-supported type wherein a metal such as Ni, Pt, Pd, Ru or the like is supported on a carrier such as carbon, silica, alumina, diatomaceous earth or the like and (2) homogeneous system catalysts such as (a) the so-called Ziegler catalysts using a combination of an organic acid salt or acetylacetone salt of Ni, Co, Fe, Cr or the like and a reducing agent such as an organoaluminum or the like and (b) the so-called organic complex catalysts such as an organometallic compound of Ru, Rh or the like. The heterogeneous system catalysts are in wide use in industry, but as compared with the homogeneous system catalysts, they are generally low in activity; therefore, in carrying out a desired hydrogenation using such a heterogeneous system catalyst, a large amount of the catalyst is required, and the hydrogenation must be effected at a high temperature at a high pressure. Therefore, the use of the heterogenous system catalyst is not economical. On the other hand, in the case of the homogeneous system catalysts, the hydrogenation proceeds generally in a homogeneous system; therefore, as compared with the heterogeneous system catalysts, the homogeneous system catalysts have a high activity, and a small amount of the catalyst is sufficient and the hydrogenation can be carried out at a lower temperature at a lower pressure. However, the homogeneous system catalysts have the drawbacks that the process for preparing them is complicated, the stability of the catalysts cannot be said to be sufficient, the reproduction is inferior and unfavorable side reactions tend to be caused. Hence, the development of a hydrogenation catalyst which has a high activity and is easy to handle has been strongly desired.

Polymers obtained by subjecting a conjugated diene to polymerization or copolymerization are widely used as an elastomer in industry. These polymers have the remaining unsaturated double bonds in the polymer chain, and the double bonds are advantageously utilized in vulcanization on one hand, but render the polymers poor in stability such as weather resistance and oxidation resistance. As a typical example, block copolymers obtained from a conjugated diene and a vinyl-substituted aromatic hydrocarbon are used in the unvulcanized state as a thermoplastic elastomer, a transparent impact-resistant resin, or a modifier for styrene resins and olefin resins; however, these copolymers are inferior in weather resistance, oxidation resistance and ozone resistance because of the unsaturated double bonds remaining in the polymer chain, which makes the copolymers unsuitable for use in the field of outer-coating materials wherein the performances are required, and the use thereof is limited.

The above inferior stability in weather resistance, oxidation resistance and ozone resistance can be remarkably improved by hydrogenating the polymers to saturate the unsaturated double bonds remaining in the polymer chain. Many processes have been proposed for hydrogenating polymers having unsaturated double bonds. In general, there are known two processes, namely, a process using the abovementioned carrier-supported type heterogeneous system catalyst (1) and a process using the above-mentioned Ziegler type homogeneous system catalyst (2). These catalysts have the above-mentioned features, respectively, and, when used in polymer-hydrogenation, they have the following further features as compared with the hydrogenation of low molecular weight compounds.

In the process using a heterogeneous system catalyst of the carrier-supported type, the hydrogenation reaction is caused by the contact of the catalyst with a polymer; therefore it becomes difficult for the reactants to contact with the catalyst owing to the viscosity of the reaction system, the steric hindrance of polymer chain, etc. Hence, for efficient hydrogenation of a polymer, a larger amount of a catalyst and more severe conditions are required, so that the decomposition and gelation of polymer tend to take place and simultaneously, the energy cost becomes higher. Further, in the hydrogenation of a copolymer of a conjugated diene and a vinyl-substituted aromatic hydrocarbon, even the aromatic nucleus portions of the copolymer are usually hydrogenated and it is difficult to selectively hydrogenate only the unsaturated double bonds of the conjugated diene units. Furthermore, the physical removal of the catalyst after hydrogenation from the hydrogenated polymer is extremely difficult and complete removal is substantially impossible.

On the other hand, in the process using a homogeneous system catalyst of the Ziegler type, the hydrogenation reaction usually proceeds in a homogeneous system; therefore, the catalyst activity is high and the hydrogenation can be effected under mild conditions. In addition, by selecting appropriate hydrogenation conditions, it is possible to preferentially hydrogenate, to a considerable extent, the unsaturated double bonds of the conjugated diene units of a copolymer of a conjugated diene and a vinyl-substituted aromatic hydrocarbon. However, in the hydrogenation of a copolymer of a conjugated diene and a vinyl-substituted aromatic hydrocarbon, preferential hydrogenation of the unsaturated double bonds of the conjugated diene units cannot sufficiently be done. Moreover, homogeneous system hydrogenation catalysts of the Ziegler type which are currently available are expensive and, in the removal of the remaining catalyst from a hydrogenation product (this removal is necessary because the remaining catalyst adversely affects the stability of the hydrogenated product), a complicated deashing step is generally required. Therefore, for economical hydrogenation, there is strongly required development of a highly active hydrogenation catalyst which is effective even in such a small amount as not to affect adversely the stability of a hydrogenated polymer and require no deashing step, or of a hydrogenation catalyst which can easily be removed from a hydrogenated polymer.

Polymers produced by hydrogenating a block copolymer of a conjugated diene and a vinyl-substituted aromatic hydrocarbon are thermoplastic elastomers having excellent weather resistance and heat resistance and now often used in industry as industrial parts, electrical parts, resin modifiers, etc. However, the polymers are not yet sufficient in elongation, adhesiveness, low-temperature characteristics, balance between mechanical strength and rubber elasticity when blended, stability, processability, etc. Under such circumstances, hydrogenated block copolymers wherein these characteristics have been improved have strongly been desired.

SUMMARY OF THE INVENTION

An object of this invention is to provide a hydrogenation catalyst which is stable, has an excellent solubility, posesses a high activity and shows a high hydrogenation activity and selectivity for olefinically unsaturated double bonds even in the absence of a reducing metal compound such as an alkyllithium compound.

Another object of this invention is to provide a process for producing a hydrogenated polymer excellent in stability such as weather resistance, oxidation resistance and ozone resistance by preferentially hydrogenating the unsaturated double bonds of the conjugated diene units of a conjugated diene polymer.

Still another object of this invention is to provide a hydrogenated block polymer which has been improved in elongation, adhesiveness, low-temperature characteristics, balance between strength and elasticity, and processability.

Other objects and advantages of this invention will become apparent from the following description.

This invention is based on a surprising finding that, without using a reducing agent including a reducing metal compound such as an alkyllithium compound or the like, a titanocene diaryl compound independently shows a very high hydrogenation activity for olefinically unsaturated double bonds and can preferentially hydrogenate the unsaturated double bonds of the conjugated diene units of a conjugated diene polymer.

According to this invention, there is provided a catalyst for hydrogenating olefinically unsaturated double bonds, comprising a compound represented by the formula (I):

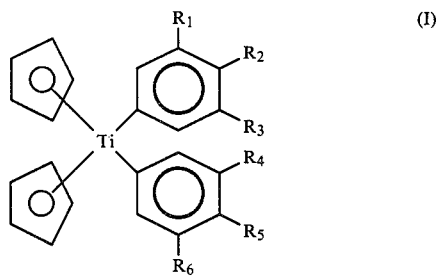

wherein $R_1$ to $R_6$ are hydrogen atoms or alkyl groups of 1 to 4 carbon atoms, and at least one of $R_1$ to $R_3$ and at least one of $R_4$ to $R_6$ are hydrogen atoms.

This invention further provides a process for the hydrogenation of a conjugated diene polymer or copolymer, which comprises contacting a conjugated diene polymer or copolymer having a number average molecular weight of 500 to 1,000,000 with hydrogen in an inert organic solvent in the presence of a hydrogenation catalyst comprising compound represented by the formula (I) to preferentially hydrogenate at least 50% of the unsaturated double bonds of the conjugated diene units in the polymer or copolymer.

This invention also provides a hydrogenated block copolymer produced by the above-mentioned hydrogenation process, the hydrogenated block copolymer comprising (a) at least two polymer blocks A each composed mainly of styrene and having a number average molecular weight of 2,000 to 60,000 and (b) at least two polymer blocks B each composed mainly of 1,3-butadiene and/or isoprene and having a number average molecular weight of 2,500 to 300,000, at least one of the polymer blocks B being present at the terminal of the copolymer chain, the content of the terminal block B being 3 to 30% by weight based on the copolymer and 4 to 50% by weight based on the total of the B blocks, the weight ratio of the terminal block B to the total of the A block being 0.1 to 1, the content of the total A blocks being 5 to 50% by weight based on the weight of the copolymer, the 1,2-vinyl content in the total of the B blocks being 20 to 50% by weight, and at least 90% of the 1,3-butadiene units and/or the isoprene units of the copolymer and 5% or less of the styrene units of the copolymer being selectively hydrogenated.

DETAILED DESCRIPTION

It is known that a kind of titanocene compound similar to the essential component of the hydrogenation catalyst of this invention, for example, a titanocene compound having aliphatic alkyl groups such as bis(cyclopentadieneyl)titanium dimethyl, bis(cyclopentadienyl)titanium diethyl or the like has a hydrogenation activity by themselves [e.g. K. Clause et al., Ann. Chem., Vol. 654, page 8 (1962)]. However, these compounds are very unstable and ignite and decompose in air at room temperature. They also rapidly decompose even in an inert gas such as helium, argon or the like at room temperature. Therefore, their isolation and handling are extremely difficult and their industrial application is virtually impossible.

On the other hand, it is already known that titanocene diaryl compounds according to this invention as represented by the general formula (I) can stably be handled in air at room temperature and can easily be isolated [e.g. L. Summers et al., J. Am. Chem. Soc., Vol. 77, page 3604 (1955) and M. D. Rausch et al., J. Organometall. Chem., Vol. 10, page 127 (1967)]. It is surprising that these compounds alone have a high hydrogenation activity notwithstanding they can stably and easily be handled in air at room temperature. In this invention, by using a hydrogenation catalyst comprising one of these compounds alone, it has become possible to selectively hydrogenate only the olefinically unsaturated double bonds of compounds having such double bonds under mild conditions even in a small amount of the catalyst. Further, the hydrogenation catalyst of this invention has a very good solubility in various organic solvents as compared with other titanocene compounds, and therefore, can easily be handled in the form of a solution. Moreover, the catalyst is free of halogen atoms, and hence, causes no problems of corrosion of equipments. Thus, the hydrogenation catalyst of this invention has very high industrial advantages.

The essential component of the catalyst for hydrogenating olefinically unsaturated double bonds according to this invention is represented by the formula:

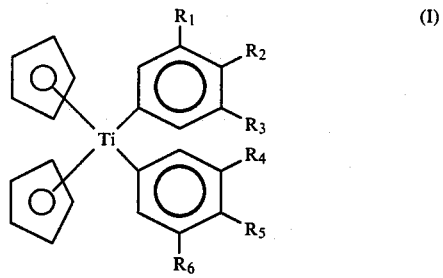

wherein $R_1$ to $R_6$ are independently hydrogen atoms or alkyl groups of 1 to 4 carbon atoms, and at least one of $R_1$ to $R_3$ and at least one of $R_4$ to $R_6$ are hydrogen atoms. When the alkyl group has 5 or more carbon atoms or all of $R_1$ to $R_3$ or all of $R_4$ to $R_6$ are alkyl groups, such compounds are difficult to synthesize in good yield because of steric hindrance and are poor in storage stability at room temperature; therefore, these compounds are not included in this invention. When alkyl groups are at the orthopositions relative to titanium, such compounds are difficult to synthesize. Specific examples of the essential component of the hydrogenation catalyst of this invention include diphenylbis(η-cyclopentadienyl)titanium, di-mtolylbis(ηtolylbis(η-cyclopentadienyl)titanium, di-p-tolylbis(η-cyclopentadienyl)titanium, di-m,p-xylylbis(η-cyclopentadieny)titanium, bis(4-ethylphenyl)bis(η-cyclopentadienyl)titanium, bis(4-butylphenyl)bis(η-cyclopentadienyl)titanium, etc. The higher the number of carbon atoms of the alkyl groups, the lower the storage stability of the compound having the alkyl group and the better the solubility of the compound in various organic solvents. Therefore, di-p-tolylbis(η-cyclopentadienyl)titanium is most preferable in view of balance between stability and solubility.

The hydrogenation catalyst of this invention can be synthesized by a known process [e.g. L. Summers et al., J. Am. Chem. Soc., Vol. 77, page 360 (1955) and M. D. Rausch et al., J. Organometall. Chem., Vol. 10, page 127 (1967)].

The hydrogenation catalyst of this invention can be applied to all compounds having olefinically unsaturated double bonds. It can preferably be applied for hydrogenation of, for example, 1-butene, 1,3-butadiene, cyclopentene, 1,3-pentadiene, 1-hexene, cyclohexene, 1-methylcyclohexene, styrene, and the like.

Since the hydrogenation catalyst of this invention, as mentioned previously, has a high and selective hydrogenation activity by itself, can stably be handled and is excellent in solubility, the catalyst is preferably applied particularly to hydrogenation of polymers having olefinically unsaturated double bonds. When the catalyst of this invention is applied to hydrogenation of such polymers, hydrogenation can be conducted in a low catalyst amount under mild conditions; therefore, unfavorable phenomena such as gelation and the like do not take place and the catalyst remaining in a hydrogenated polymer does not adversely affect the stability of the polymer and need not be removed after hydrogenation; therefore, the catalyst of this invention enables an efficient and economical hydrogenation and is highly useful in industry.

The catalyst of this invention can be applied to all polymers having olefinically unsaturated double bonds. Preferably, the catalyst is applied to conjugated diene polymers or copolymers. Such conjugated diene polymers or copolymers include homopolymers of a conjugated diene, copolymers of different conjugated dienes and copolymers of at least one conjugated diene and at least one olefin monomer copolymerizable with said conjugated diene. The conjugated dienes used in the production of these conjugated diene polymers or copolymers are generally those having 4 to about 12 carbon atoms. Specific examples thereof are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, etc. Of these, 1,3-butadiene and isoprene are particularly preferred in view of advantages in industrial application and of excellent properties of elastomers obtained.

The catalyst of this invention can particularly preferably be applied to hydrogenation of copolymers of at least one conjugated diene and at least one olefin monomer copolymerizable with said conjugated diene. The preferable conjugated dienes used in production of such copolymers are those mentioned above. As the olefin monomers, there may be used all olefin monomers copolymerizable with said conjugated dienes, and vinyl substituted aromatic hydrocarbons are particularly preferred. That is, in order to enable the catalyst of this invention to sufficiently exhibit its effect on the selective hydrogenation of only the unsaturated double bonds of the conjugated diene units and to produce an elastomer or thermoplastic elastomer of high industrial value, copolymers of a conjugated diene and a vinyl-substituted aromatic hydrocarbon are particularly useful. Specific examples of the vinyl-substituted aromatic hydrocarbon used in production of such copolymers include styrene, t-butylstyrene, α-methylstyrene, p-methylstyrene, divinylbenzene, 1,1-diphenylethylene, N,N-dimethyl-p-aminoethylstyrene, N,N-diethyl-p-aminoethylstyrene, etc. Of these, styrene is particularly preferred. Specific examples of the copolymers of a conjugated diene and a vinyl-substituted aromatic hydrocarbon include a butadiene/styrene copolymer and an isoprene/styrene copolymer, and these two copolymers are the most preferable because they provide hydrogenated copolymers of high industrial value.

The copolymers of a conjugated diene and a vinyl-substituted aromatic hydrocarbon include random copolymers wherein monomers are statistically distributed throughout the entire polymer chain, tapered block copolymers, complete block copolymers and graft copolymers. Of these, block copolymers are particularly preferred in order to allow the copolymers to exhibit the characteristics as thermoplastic elastomers useful in industry.

Such block copolymers are copolymers comprising (a) at least one polymer block A composed mainly of a vinyl-substituted aromatic hydrocarbon and (b) at least one polymer block B composed mainly of a conjugated diene. The block A may contain a slight amount of the conjugated diene and the block B may contain a slight amount of the vinyl-substituted aromatic hydrocarbon. The block copolymer includes not only linear type but also the so-called branched type, radial type and star type which are formed by coupling the linear block polymers with a coupling agent. Block copolymers preferably used in this invention are those containing 5 to 95% by weight of a vinyl-substituted aromatic hydrocarbon. It is particularly preferable that the microstructure of the conjugated diene unit has a 1,2-vinyl content of 20 to 70%. When block copolymers meeting these requirements are hydrogenated, their olefin portions have a good elasticity, and therefore, they are not only useful in industry, but also low in solution viscosity and easy to free of the solvent. Therefore, the hydrogenated block copolymers can economically be produced.

More preferably, the above block copolymer has at least two above-mentioned polymer blocks A having a number average molecular weight of 2,000 to 60,000 and at least two above-mentioned polymer blocks B having a number average molecular weight of 2,500 to 300,000, at least one of said blocks B being present at the terminal of the copolymer chain, the content of the terminal block B being 3 to 30% by weight based on the weight of the copolymer and 4 to 50% by weight based on the total weight of the blocks B, the weight ratio of the terminal block B to the total of the blocks A being 0.1 to 1.0. In particular, a block copolymer of styrene and 1,3-butadiene and/or isoprene is preferred.

When a block copolymer having the terminal block B in the amount specified above is subjected to selective hydrogenation of butadiene units with the catalyst of this invention, the resulting hydrogenated block copolymer shows a good elongation, adhesion, low-temperature characteristics and processability. When this hydrogenated block copolymer is used as a component of a composition, the composition has a good balance between mechanical strength and rubber elasticity and further has a good compatibility with olefin resins. Thus, the hydrogenated block copolymer are very useful.

The block copolymer having the terminal block B can have any structure of linear, branched, radial and star types. The block copolymer includes copolymers represented by the following formulas:

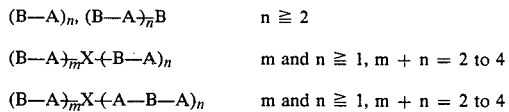

| | |
|---|---|
| (B—A)$_n$, (B—A)$_{\overline{n}}$B | n ≧ 2 |
| (B—A)$_{\overline{m}}$X-(B—A)$_n$ | m and n ≧ 1, m + n = 2 to 4 |
| (B—A)$_{\overline{m}}$X-(A—B—A)$_n$ | m and n ≧ 1, m + n = 2 to 4 |

In the above formulas, A is a polymer block composed mainly of a vinyl-substituted aromatic hydrocarbon; B is a polymer block composed mainly of a conjugated diene; and X is a coupling agent. A and B may be the same or different in structure and molecular weight. In order to obtain a hydrogenated block copolymer having physical properties as good as possible, it is desirable that the precursor block copolymer, namely the block copolymer before hydrogenation, has a vinyl-substituted aromatic hydrocarbon content of 5 to 50%, preferably 10 to 40%, and has a 1,2-vinyl content of 20 to 50%, preferably 25 to 45%, in the conjugated diene units.

The content of the polymer blocks composed mainly of a vinyl-substituted aromatic hydrocarbon in the conjugated diene polymer or copolymer used in this invention can be measured in accordance with the method described in L. M. Kolthoff et al., J. Polymer Sci., Vol. 1, page 429 (1946). The content is expressed as a percentage of the above polymer blocks in the entire polymer or copolymer.

The 1,2-vinyl content in the conjugated diene units of the conjugated diene polymer or copolymer can be determined in accordance with the Hampton method [R. R. Hampton, Anal. Chem., Vol. 29, page 923 (1949)] using infrared absorption spectrum. [Details are described in Japanese Patent Application Kokai (Laid-Open) No. 133,203/84 and British Patent Application Publication No. 2,134,909 (Application No. 8400305).]

Conjugated diene polymers or copolymers used in the hydrogenation of this invention generally have a molecular weight of about 500 to about 1,000,000 and can be produced by any known polymerization method such as anionic polymerization method, cationic polymerization method, coordination polymerization method, radical polymerization method, or the like, and solution polymerization method, emulsion polymerization method or the like. Living polymers containing active lithium in the polymer chain which are produced by an anionic polymerization method using an organolithium compound as a catalyst, can be hydrogenated continuously without any deactivation of the living terminals. This hydrogenation is efficient and economical, and therefore, particularly useful in industry. As the catalyst used in the production of such living polymers, there are hydrocarbon compounds having at least one lithium atom in the molecule. Typical examples of the compounds include n-butyllithium, sec-butyllithium, etc.

A preferable embodiment of the hydrogenation of this invention is conducted in an inert organic solvent solution of a compound having at least one olefinically unsaturated double bond or the above-mentioned polymer or copolymer. In the case of a low molecular weight compound which is liquid at room temperature, such as cyclohexene or cyclooctene, hydrogenation can be effected without dissolving the compound in a solvent; however, in order to conduct the hydrogenation uniformly and under mild conditions, the hydrogenation in a solvent is preferred. The term "inert organic solvent" means an organic solvent which does not react with any material participating in the hydrogenation. Preferable examples of the inert organic solvent include aliphatic hydrocarbons such as n-pentane, n-hexane, n-heptane and n-octane; alicyclic hydrocarbons such as cyclohexane and cycloheptane; and ethers such as diethyl ether and tetrahydrofuran. These solvents can be used alone or in admixture. Also, aromatic hydrocarbons such as benzene, toluene, xylene and ethylbenzene can be used only when the aromatic double bonds are not hydrogenated under specially selected hydrogenation conditions.

In the hydrogenation of a living polymer containing active lithium in the polymer chain, it is advantageous that the living polymer be beforehand produced in the inert organic solvent mentioned above and the polymerization mixture as produced be then subjected to hydrogenation.

The hydrogenation reaction of this invention is generally conducted by keeping an inert organic solvent solution of a substance to be hydrogenated, at a predetermined temperature in hydrogen or in an inert atmosphere, adding thereto a hydrogenation catalyst with or without stirring, and then introducing thereinto a hydrogen gas to the desired pressure. The inert atmosphere means an atmosphere which does not react with any material participating in the hydrogenation reaction, such as, for example, helium, neon, argon or the like. Air and oxygen are not desirable because they oxidize and deactivate a catalyst component. It is most preferable that an atmosphere composed solely of hydrogen gas be present in a hydrogenation vessel.

The catalyst of this invention may be added alone to a reaction system as it is or may be added in the form of an inert organic solvent solution. When the catalyst is used in the form of an inert organic solvent solution, the inert organic solvent may be any of the previously mentioned solvents which do not react with any material participating in the hydrogenation. Preferably, the solvent to be used for dissolving the catalyst is the same as used in the hydrogenation.

The amount of the catalyst added is 0.005 to 20 mM per 100 g of a substance to be hydrogenated. When the catalyst is added within this range, the olefinically unsaturated double bonds of the substance to be hydrogenated can preferentially be hydrogenated and substantially no double bonds of the aromatic nuclei are hydrogenated; thus a very high degree of selective hydrogenation can be realized. Hydrogenation is possible even when the catalyst is added in an amount of more than 20 mM; however, addition of excessive catalyst is uneconomical and makes the catalyst removal or ash removal after hydrogenation from a hydrogenated polymer more complicated. The preferable amount of the catalyst added for quantitatively hydrogenating the unsaturated double bonds of the conjugated diene units of the polymer under the selected conditions is 0.05 to 5 mM per 100 g of the polymer.

In the hydrogenation of a living polymer having active lithium in the polymer chain, the molar ratio of the active lithium to the titanium in the catalyst is preferably about 25 or less because the active lithium has a reducing property and affects the catalyst activity. When the molar ratio exceeds about 25, the catalyst activity is reduced and unfavorable phenomena such as gelation and the like take place. The molar ratio is more preferably about 15 or less.

The amount of the active lithium in the living polymer varies depending upon the molecular weight of the living polymer, the functionality of the organolithium compound used as a catalyst in the production of the living polymer, the deactivation percentage of the active lithium and the coupling percentage of the active lithium. Hence, in order to obtain the above-mentioned active lithium-to-titanium molar ratio, it is necessary that the amount of the catalyst used in the hydrogenation be determined based on the concentration of lithium in the polymer chain. Meanwhile, the amount of the hydrogenation catalyst added is preferably 0.005 to 20 mM per 100 g of a substance to be hydrogenated. Therefore, when the active lithium-to-titanium molar ratio cannot be adjusted to about 25 or less within the above catalyst amount range, the molar ratio is adjusted by previously deactivating part of the active lithium in the living polymer with water, an alcohol, a halogen compound or the like.

The hydrogenation of this invention is conducted using elementary hydrogen. The elementary hydrogen is preferably introduced in a gaseous state into a solution of a substance to be hydrogenated. The hydrogenation reaction is preferably conducted with stirring, whereby hydrogen introduced can rapidly be contacted with a substance to be hydrogenated. The hydrogenation reaction is generally conducted at 0° to 150° C. When the temperature is lower than 0° C., the catalyst activity is reduced and the hydrogenation speed is low and requires a large amount of a catalyst. The temperature of less than 0° C. is not economical. When the temperature is higher than 150° C., side reactions, decomposition and gelation are liable to take place and even the hydrogenation of the aromatic nucleus portions tends to occur, and the selectivity of hydrogenation is reduced. Thus, the temperature of more than 150° C. is not desirable. The hydrogenation temperature is more preferably 40° to 120° C.

The pressure of hydrogen used in the hydrogenation is preferably 1 to 100 kg/cm$^2$. When the pressure is lower than 1 kg/cm$^2$, the hydrogenation speed is low and substantially no hydrogenation proceeds. Therefore, it is difficult to increase hydrogenation percentage. When the pressure is higher than 100 kg/cm$^2$, the hydrogenation is almost complete at the same time when the pressure is elevated to such a value, and hence such a higher pressure is substantially insignificant. Further, side reactions and gelation which are unfavorable take place. The pressure of hydrogen used in the hydrogenation is more preferably 2 to 30 kg/cm$^2$. An optimum hydrogen pressure is selected in relation to parameters such as the amount of catalyst added and the like. Actually, it is preferable that, as the preferable catalyst amount mentioned previously gets smaller, the hydrogen pressure be used on a higher side.

In this invention, the hydrogenation time usually ranges from several seconds to 50 hours. The hydrogenation time can appropriately be selected within the range depending upon other hydrogenation conditions adopted.

The hydrogenation catalyst of this invention has a sufficient activity by itself and no other component may be contained. However, a reducing organometal compound such as an organoaluminum and an organolithium may be present in the reaction system, and a polar compound such as tetrahydrofuran, triethylamine and N,N,N',N'-tetramethylethylenediamine may also be present therein.

The hydrogenation catalyst of this invention enables quantitative hydrogenation of olefinically unsaturated double bonds by proper selection of hydrogenation conditions. The catalyst further enables hydrogenation of such double bonds to a desired hydrogenation level. In the hydrogenation of a polymer, a hydrogenated polymer can be obtained wherein at least 50%, preferably at least 90%, of the unsaturated double bonds of the conjugated diene units of the original polymer has been hydrogenated. In the hydrogenation of a copolymer of a conjugated diene and a vinyl-substituted aromatic hydrocarbon, a hydrogenated copolymer can be obtained wherein at least 50%, preferably at least 90%, of the unsaturated double bonds of the conjugated diene units of the original copolymer and 10% or less, preferably 5% or less, of the double bonds of the aromatic nucleus portions of the original copolymer have been selectively hydrogenated. When the hydrogenation percentage of the conjugated diene units is less than 50%, the hydrogenated polymer or copolymer is not sufficiently improved in weather resistance, oxidation resistance and heat resistance. In the hydrogenation of a copolymer of a conjugated diene and a vinyl-substituted aromatic hydrocarbon, if even the aromatic nucleus portions are hydrogenated, no improvement is seen in physical properties of a hydrogenated copolymer and, when the copolymer is a block copolymer, it follows that the hydrogenated block copolymer has a deteriorated processability and a deteriorated moldability. In the hydrogenation of the aromatic nucleus portions, a large amount of hydrogen is consumed, and a high temperature, a high pressure and a long time are required; therefore, the hydrogenation is economically difficult to conduct. The polymer hydrogenation catalyst according to this invention is very excellent in selectivity and causes no substantial hydrogenation of the aromatic nucleus portions and accordingly is very advantageous in industry.

The hydrogenation percentage of olefinically unsaturated double bonds can be determined from an infrared absorption spectrum. In the case of a low molecular weight substance, gas chromoatography can be used in combination therewith. In the case of a polymer containing aromatic rings, an ultraviolet absorption spectrum, an NMR spectrum, or the like can be used in combination therewith.

From the solution obtained by a hydrogenation with the catalyst of this invention, the hydrogenated product can easily be separated by a physical or chemical means such as distillation, precipitation or the like. Particularly, the hydrogenated product can easily be isolated from the hydrogenated polymer solution obtained after, if necessary, the catalyst residue has been removed. This isolation of a hydrogenated polymer can be conducted by, for example, (1) a method wherein the reaction mixture after hydrogenation is mixed with a polar solvent which becomes a poor solvent for a hydrogenated polymer, such as acetone, an alcohol or the like, to precipitate and recover the polymer, (2) a method wherein the reaction mixture is poured into hot water with stirring and then the polymer is recovered together with the solvent by distillation, and (3) a method wherein the reaction mixture is heated to distil off the solvent. The hydrogenation process of this invention has the feature that a small amount of a hydrogenation catalyst is used. Therefore, even if the hydrogenation catalyst remains in the hydrogenated polymer, it has no remarkable effect on the physical properties of the hydrogenated polymer. Further, most of the catalyst remaining in the hydrogenated polymer is decomposed and removed from the polymer in the isolation step of the hydrogenated polymer. Hence, no special operation for catalyst removal is required and isolation of the hydrogenated polymer can be conducted in a very simple procedure. In addition, since the catalyst of this invention is free of halogen element, no problems of corrosion of equipment are caused, and hence the hydrogenation process of this invention is very advantageous.

Hydrogenated block copolymers of a conjugated diene and styrene according to this invention are very useful in industry as a thermoplastic elastomer with improved weather resistance, heat resistance, adhesiveness, low-temperature characteristics, blendability and processability.

As stated above, the novel hydrogenation catalyst of this invention enables efficient hydrogenation of olefinically unsaturated double bonds, particularly (1) hydrogenation of a conjugated diene polymer under mild conditions using a highly active catalyst and (2) highly preferential hydrogenation of the unsaturated double bonds of the conjugated diene units of a copolymer of a conjugated diene and a vinyl-substituted aromatic hydrocarbon.

Hydrogenated polymers obtained by the process of this invention can be used as an elastomer, thermoplastic elastomer or thermoplastic resin which has excellent weather resistance and oxidation resistance. These hydrogenated polymers are mixed before use with additives such as an ultraviolet light absorber, an oil, a filler and the like. The hydrogenated polymers may be blended with other elastomers and resins. Thus, the hydrogenated polymers are very useful in industry.

PREFERRED EMBODIMENTS

Hereinunder, this invention will be explained in detail referring to Examples. However, this invention should not be interpreted to be restricted to the Examples.

REFERENCE EXAMPLE 1 (Synthesis of hydrogenation catalyst I)

In a one-liter, three-necked flask equipped with a stirrer, a dropping funnel and a reflux condenser was placed 200 ml of anhydrous ether. The flask was purged with dry helium and 17.4 g (2.5 moles) of small pieces of lithium wire were put into the flask. Thereafter, a small amount of a solution consisting of 300 ml of ether and 157 g (1 mole) of bromobenzene was dropped into the flask at room temperature and then the remaining part of the solution was gradually added under reflux.

After completion of the reaction, the reaction mixture was filtered in a helium atmosphere to obtain a colorless, transparent solution of phenyllithium.

In a two-liter, three-necked flask equipped with a stirrer and a dropping funnel, which had been purged with dry helium, were placed 99.6 g (0.4 mole) of dichlorobis(cyclopentadienyl)titanium and 500 ml of anhydrous ether. Thereinto was dropped the previously obtained ether solution of phenyllithium over about 2 hours at room temperature with stirring. The reaction mixture was filtered in air. The insoluble portion was washed with dichloromethane. The washings and the filtrate were combined and freed of the solvent under reduced pressure. The residue was dissolved in a small amount of dichloromethane. To the resulting solution was added petroleum ether to effect recrystallization. The resulting crystal was collected by filtration. The filtrate was concentrated and the above procedure was repeated to obtain diphenylbis($\eta$-cyclopentadienyl)titanium. The yield was 120 g (90%). The product was an orange-yellow, needle-like crystal having a good solubility in toluene and cyclohexane, a melting point of 147° C. and the following elementary analysis values: C: 79.5%; H: 6.1%; Ti: 14.4%.

REFERENCE EXAMPLE 2 (Synthesis of hydrogenation catalyst II)

Synthesis was conducted in the same manner as in Reference Example 1, except that p-bromotoluene was substituted for the bromobenzene, to obtain di-p-tolylbis($\eta$-cyclopentadienyl)titanium in a yield of 87%. This product was a yellow crystal having a good solubility in toluene and cyclohexane, a melting point of 145° C. and the following elementary analysis values: C: 80.0%; H: 6.7%; Ti: 13.3%.

REFERENCE EXAMPLE 3 (Synthesis of hydrogenation catalyst III)

Synthesis was conducted in the same manner as in Reference Example 1, except that 4-bromo-o-xylene was substituted for the bromobenzene, to obtain di-m,p-xylylbis($\eta$-cyclopentadienyl)titanium in a yield of 83%. This product was a yellow crystal having a good solubility in toluene and cyclohexane, a melting point of 155° C. and the following elementary analysis values: C: 80.6%; H: 7.2%; Ti: 12.2%.

REFERENCE EXAMPLE 4 (Synthesis of hydrogenation catalyst IV)

Synthesis was conducted in the same manner as in Reference Example 1, except that p-bromoethylbenzene was substituted for the bromobenzene, to obtain bis(4-ethyl phenyl)bis($\eta$-cyclopentadienyl)titanium in a yield of 80%. This product was a yellow crystal having a good solubility in toluene and cyclohexane, a melting point of 154° C. and the following elementary analysis values: C: 80.4%; H: 7.3%; Ti: 12.3%.

REFERENCE EXAMPLE 5 (SYNTHESIS OF BUTADIENE POLYMER)

In a two-liter autoclave were placed 500 g of cyclohexane, 100 g of 1,3-butadiene and 0.05 g of n-butyllithium. They were subjected to polymerization for 3 hours at 60° C. with stirring. The resulting living polymer solution was poured into a large amount of methanol for deactivation and precipitation. The polymer precipitated was vacuum-dried for 50 hours at 60° C. The polymer was a polybutadiene having a 1,2-vinyl content of 11% and having a number average molecular weight of about 150,000 as measured by a gel permeation chromatography (GPC).

REFERENCE EXAMPLE 6 (SYNTHESIS OF ISOPRENE POLYMER)

A polyisoprene was produced in the same manner as in Reference Example 5, except that isoprene was substituted for the 1,3-butadiene. The polyisoprene had a 1,2-vinyl content of 10% and a number average molecular weight of about 150,000.

REFERENCE EXAMPLE 7 (SYNTHESIS OF BLOCK COPOLYMER I)

In an autoclave were placed 400 g of cyclohexane, 15 g of styrene and 0.11 g of n-butyllithium. The resulting mixture was subjected to polymerization for 3 hours at 60° C. Then, 70 g of 1,3-butadiene was added and polymerization was conducted for 3 hours at 60° C. Finally, 15 g of styrene was added and polymerization was conducted for 3 hours at 60° C. The resulting living polymer solution was pured into a large amount of methanol for deactivation and precipitation. The polymer precipitated was vacuumdried for 50 hours at 60° C.

The polymer obtained was a styrene-butadiene-styrene block copolymer having a bound styrene content of 30%, a block styrene content of 28% and a 1,2-vinyl content in the butadiene units of 12% (8% based on the weight of the entire copolymer) and having a number average molecular weight of about 60,000.

REFERENCE EXAMPLE 8 (SYNTHESIS OF BLOCK COPOLYMER II)

A styrene-butadiene-styrene block copolymer having a high styrene content was produced in the same manner as in Reference Example 7, except that styrene was used in an amount of 40 g each time (a total amount of 80 g) and butadiene was used in an amount of 20 g.

This block copolymer had a bound styrene content of 80% and a 1,2-vinyl content in the butadiene units of 15% (3% based on the weight of the entire copolymer) and had a number average molecular weight of about 60,000.

REFERENCE EXAMPLE 9 (SYNTHESIS OF BLOCK COPOLYMER III)

In the same manner as in Reference Example 7, except that tetrahydrofuran was also used in an amount of 35 moles per mole of n-butyllithium, to produce a styrene-butadiene-styrene block copolymer having a bound styrene content of 30%, a block styrene content of 24% and a 1,2-vinyl content in the butadiene units of 39% (23% based on the weight of the entire block copolymer).

REFERENCE EXAMPLE 10 (SYNTHESIS OF BLOCK COPOLYMER IV)

In the same manner as in Reference Example 7, except that n-butyllithium was used in an amount of 0.055 g and tetrahydrofuran was used in an amount of 32 moles per mole of n-butyllithium, to produce a styrene-butadiene-styrene block copolymer having a bound styrene content of 30%, a block styrene content of 28% and a 1,2-vinyl content in the butadiene units of 35% (25% based on the weight of the entire block copolymer) and having a number average molecular weight of about 120,000.

REFERENCE EXAMPLE 11 (SYNTHESIS OF BLOCK COPOLYMER V)

In an autoclave were placed 2,000 g of cyclohexane, 65 g of 1,3-butadiene, 0.75 g of n-butyllithium and tetrahydrofuran in a proportion of 40 moles per mole of n-butyllithium. The resulting mixture was subjected to polymerization for 45 min at 70° C., and 100 g of styrene was added and then polymerized for 30 minutes, after which 235 g of 1,3-butadiene was added and subsequently polymerized for 45 minutes. Moreover, 100 g of styrene was added and then polymerized for 30 minutes. The resulting living polymer solution was poured into a large amount of methanol for deactivation and precipitation. The precipitated polymer was vacuum-dried for 50 hours at 60° C.

The polymer was a butadiene-styrene-butadiene-styrene block copolymer having a bound styrene content of 40%, a block styrene content of 34% and a 1,2-vinyl content in the butadiene units of 36% (22% based on the weight of the entire block copolymer) and having a number average molecular weight of about 60,000.

REFERENCE EXAMPLE 12 (SYNTHESIS OF BLOCK COPOLYMER VI)

Polymerization was conducted in the same manner as in Reference Example 11, except that 50 g of 1,3-butadiene, 75 g of styrene, 300 g of 1,3-butadiene and 75 g of styrene were added in this order. Finally, 50 g of 1,3-butadiene was further added and polymerization was conducted for 30 minutes. The resulting polymer solution was treated in the same manner as in Reference Example 11 to obtain a butadiene-styrene-butadiene-styrene-butadiene block copolymer having a bound styrene content of 30%, a block styrene content of 27% and a 1,2-vinyl content in the butadiene units of 38% (27% based on the weight of the entire block copolymer) and having a number average molecular weight of about 60,000.

REFERENCE EXAMPLE 13 (SYNTHESIS OF BLOCK COPOLYMER VII)

In an autoclave were placed 4,000 g of cyclohexane, 100 g of 1,3-butadiene monomer, 0.53 g of n-butyllithium and tetrahydrofuran in a proportion of 40 moles per mole of n-butyllithium. They were subjected to polymerization for 30 minutes at 70° C., and then 150 g of styrene was added and subsequently polymerized for 60 minutes, after with 600 g of 1,3-butadiene was added and polymerized for 150 minutes. Thereafter, 150 g of styrene was added and subsequently polymerized for 60 minutes, to obtain a butadiene-styrene-butadiene-styrene block copolymer. The resulting living polymer solution was poured into a large amount of methanol for deactivation and precipitation. The precipitated polymer was vacuum-dried for 50 hours at 60° C. The polymer was a block copolymer having a bound styrene content of 30%, a block styrene content of 28% and a 1,2-vinyl content in the butadiene units of 35% (25% based on the weight of the entire copolymer) and having a number average molecular weight of about 120,000.

REFERENCE EXAMPLE 14 (SYNTHESIS OF BLOCK COPOLYMER VIII)

A styrene-isoprene-styrene block copolymer was produced in the same manner as in Reference Example 7, except that isoprene was substituted for the 1,3-butadiene.

The copolymer had a bound styrene content of 30%, a block styrene content of 29% and a 1,2-vinyl content in the isoprene units of 13% (9% based on the weight of the entire copolymer) and had a number average molecular weight of about 60,000.

REFERENCE EXAMPLE 15 (SYNTHESIS OF LIVING POLYMER I)

A living polybutadiene was produced in the same manner as in Reference Example 5. It contained 0.65 mM of living lithium per 100 g of polymer. A part of the polymer was isolated and analyzed to find that the polymer had a 1,2-vinyl content of 13% and a number average molecular weight of about 150,000.

REFERENCE EXAMPLE 16 (SYNTHESIS OF LIVING POLYMER II)

A styrene-butadiene-styrene living block copolymer was produced in the same manner as in Reference Example 7. It contained 1.65 mM of living lithium per 100 g of copolymer. A part of the copolymer was isolated and analyzed to find that the copolymer had a bound styrene content of 30%, a block styrene content of 28% and a 1,2-vinyl content in the butadiene units of 13% (9% based on the weight of the entire copolymer) and had a number average molecular weight of about 60,000.

REFERENCE EXAMPLE 17 (SYNTHESIS OF LIVING POLYMER III)

In the same manner as in Reference Example 11, a butadiene-styrene-butadiene-styrene living block copolymer was synthesized. This copolymer had a bound styrene content of 40%, a block styrene content of 35% and a 1,2-vinyl content in the butadiene units of 35% and had a number average molecular weight of about 60,000. The copolymer contained 1.65 mM of active lithium per 100 g of the copolymer.

REFERENCE EXAMPLE 18 (SYNTHESIS OF LIVING POLYMER IV)

A butadiene-styrene-butadiene-styrene living block copolymer was synthesized in the same manner as in Reference Example 13. It had a bound styrene content of 30% and a 1,2-vinyl content in the butadiene units of 35% and had a number average molecular weight of about 120,000. The copolymer contained 0.82 mM of living lithium per 100 g of the copolymer.

EXAMPLES 1 to 4

1-Hexene and cyclohexene were separately diluted with cyclohexane at a concentration of 15%. These olefin solutions were used in hydrogenation.

In a sufficiently dried, two-liter autoclave equipped with a stirrer was placed 1,000 g of each of the olefin solutions. Each of the autoclaves was degased under reduced pressure and purged with hydrogen. Then, the autoclave contents were kept at 90° C. with stirring.

Subsequently, into each of the autoclaves was fed, at one time, a solution obtained by dissolving 4 mM of each of the hydrogenation catalysts produced in Reference Examples 1 to 4 in cyclohexane at a concentration of 2% by weight. Further, 5.0 kg/cm$^2$ of dried, gaseous hydrogen was fed to the autoclave, and hydrogenation was conducted for 2 hours with stirring. Absorption of hydrogen was substantially completed within 30 minutes in all cases of the hydrogenation catalysts. The reaction mixture was a colorless, transparent and uniform solution. The reaction mixture was returned to room temperature and normal pressure and then hydrogenation degree was measured using a gas chromatography.

The results of the hydrogenation of 1-hexene or cyclohexene with each of the hydrogenation catalysts are summarized in Table I.

As seen from Table I, the olefinically unsaturated double bonds of 1-hexene and cyclohexene were almost quantitatively hydrogenated and a very good hydrogenation activity was shown.

TABLE I

| Example No. | 1 | 2 | 3 | 4 |
|---|---|---|---|---|
| Hydrogenation catalyst | Reference Example 1 | Reference Example 2 | Reference Example 3 | Reference Example 4 |
| | Hydrogenation percentage of olefin (%) | | | |
| 1-Hexene | 99 | 100 | 98 | 96 |
| Cyclohexene | 100 | 100 | 99 | 97 |

EXAMPLES 5 to 18 AND COMPARATIVE EXAMPLE 1

Each of the polymers produced in Reference Examples 5 to 14 was diluted with purified and dried cyclohexane at a concentration of 5% by weight, and each of the polymer solutions obtained was subjected to hydrogenation. Also, each of the living polymer solutions obtained in Reference Examples 15 to 18 was diluted with purified and dried cyclohexane at a living polymer concentration of 5% by weight, and each of the living polymer solutions obtained was subjected to hydrogenation.

In a sufficiently dried, two-liter autoclave equipped with a stirrer was placed 1,000 g of each of the polymer solutions or the living polymer solutions prepared above. The autoclave was degased under reduced pressure and then purged with hydrogen. The autoclave content was kept at 90° C. with stirring. To the autoclave was fed, at one time, a 2% by weight solution obtained by dissolving 0.2 mM of the hydrogenation catalyst produced in Reference Example 2 in cyclohexane. Further, 5.0 kg/cm$^2$ of dried, gaseous hydrogen was fed to the autoclave, and hydrogenation was conducted for 2 hours with stirring. Absorption of hydrogen was substantially completed within 60 minutes in all cases. The reaction mixture was a colorless, transparent and uniform solution. The reaction mixture was returned to room temperature and normal pressure, taken out of the autoclave and poured into a small amount of methanol to precipitate a polymer. The polymer was collected by filtration and dried to obtain a white hydrogenated polymer. The hydrogenation percentage and properties of each of the hydrogenated polymers obtained are shown in Table II.

As seen from Table II, in all the polymers, the conjugated diene units were quantitatively hydrogenated and the styrene units were scarcely hydrogenated. Thus, the hydrogenation catalyst used exhibited a very good activity and selectively.

In Comparative Example 1, the polybutadiene obtained in Reference Example 5 was hydrogenated in the same manner as above, except that a toluene solution of dichlorobis($\eta$-cyclopentadienyl)titanium was used as the hydrogenation catalyst. The results are shown in Table II.

TABLE III-continued

| | Example | | | | | | | |
|---|---|---|---|---|---|---|---|---|
| | 19 | 20 | 21 | 22 | 23 | 24 | 25 | 26 |
| Hydrogenation percentage of butadiene units (%) | 97 | 98 | 96 | 98 | 97 | 96 | 97 | 98 |
| Hydrogenation percentage of styrene units (%) | <1 | <1 | <1 | <1 | <1 | <1 | <1 | <1 |

EXAMPLE 27

Hydrogenation was conducted in the same manner as in Example 7 under the same conditions as in Example 7, except that a 2% by weight solution obtained by dissolving 0.2 mM of the catalyst produced in Reference Example 2 in cyclohexane and thereafter allowing it to stand for 30 days at room temperature in an argon atmosphere in a dark place was used as the hydrogenation catalyst.

TABLE II

| | Example | | | | | | | | | | | | | | Comp. Example |
|---|---|---|---|---|---|---|---|---|---|---|---|---|---|---|---|
| | 5 | 6 | 7 | 8 | 9 | 10 | 11 | 12 | 13 | 14 | 15 | 16 | 17 | 18 | 1 |
| Kind of hydrogenation catalyst | ← Reference Example 2 → | | | | | | | | | | | | | | Cp$_2$TiCl$_2$ |
| Kind of polymer (expressed by Reference Example number) | 5 | 6 | 7 | 8 | 9 | 10 | 11 | 12 | 13 | 14 | 15 | 16 | 17 | 18 | 5 |
| Li/Ti molar ratio | 0 | 0 | 0 | 0 | 0 | 0 | 0 | 0 | 0 | 0 | 1.7 | 4.1 | 4.2 | 2.1 | 0 |
| Hydrogenation percentage of conjugated diene units (%) | 98 | 96 | 97 | 98 | 99 | 99 | 97 | 98 | 99 | 98 | 99 | 97 | 96 | 97 | 1 |
| Hydrogenation percentage of styrene units (%) | — | — | <1 | <1 | <1 | <1 | <1 | <1 | <1 | <1 | — | <1 | <1 | <1 | — |
| Properties of hydrogenated polymer | Soft resin | | Hard resin | | | Soft, thermoplastic elastomer | | | | Hard resin | Soft resin | Hard resin | Soft, thermoplastic elastomer | | — |

EXAMPLES 19 to 26

The butadiene-styrene-butadiene-styrene block copolymer synthesized in Reference Example 11 was diluted with purified, dried cyclohexane at a copolymer concentration of 5% by weight. Into an autoclave was charged 1,000 g of the resulting solution, and subjected to hydrogenation in the same manner as in Example 5 under the conditions shown in Table III. The results are shown in Table III.

TABLE III

| | Example | | | | | | | |
|---|---|---|---|---|---|---|---|---|
| | 19 | 20 | 21 | 22 | 23 | 24 | 25 | 26 |
| Kind of hydrogenation catalyst | Reference Example 2 | | | | | Ref. Ex. 1 | | |
| Amount of hydrogenation catalyst (mM/100 g of polymer) | 0.1 | 1.0 | 1.0 | 3.0 | 3.0 | 0.1 | 1.0 | 3.0 |
| Hydrogenation pressure (kg/cm$^2$) | 30 | 10 | 5 | 5 | 2 | 30 | 5 | 5 |
| Hydrogenation temperature (°C.) | 100 | 100 | 60 | 100 | 60 | 100 | 60 | 100 |
| Hydrogenation time (minute) | 120 | 60 | 120 | 30 | 120 | 120 | 120 | 30 |

In the hydrogenated copolymer obtained, the hydrogenation percentage of the butadiene units was 96% and that of the styrene units was less than 1%, which were equivalent to those of Example 7, and when the catalyst was stored in solution, the activity and selectivity thereof did not change.

EXAMPLES 28 to 32 and COMPARATIVE EXAMPLE 2

In a dried, two-liter autoclave was placed 1,000 g of a living copolymer solution obtained by diluting the styrene-butadiene-styrene block copolymer produced in Reference Example 16, with dried cyclohexane at a copolymer concentration of 10% by weight. The autoclave was purged with dried hydrogen gas.

Thereto was added the predetermined amount of a cyclohexane solution containing 5.0 mM/100 ml of n-butanol or 20 mM/100 ml of n-butyllithium, to control the lithium amount so that the molar ratio of active lithium to titanium at the start of hydrogenation became the level shown in Table IV.

Then, a cyclohexane solution containing 0.4 mM/100 ml of the hydrogenation catalyst produced in Reference Example 2 was added in the amount shown in Table IV, and hydrogenation was conducted under the conditions shown in Table IV. The results are shown in Table IV.

TABLE IV

|  | Example | | | | | Comparative |
|---|---|---|---|---|---|---|
|  | 28 | 29 | 30 | 31 | 32 | Example 2 |
| Amount of hydrogenation catalyst (mM/100 g of polymer) | 0.2 | 0.5 | 0.2 | 0.2 | 0.2 | 0.2 |
| Control of lithium amount | Deactivation with n-butanol | | | | Addition of n-butyllithium | |
| Molar ratio of Li/Ti | 1.0 | 2.0 | 4.0 | 8.0 | 15.0 | 30.0 |
| Hydrogenation pressure (kg/cm$^2$) | 10 | 5 | 10 | 5 | 10 | 10 |
| Hydrogenation temperature (°C.) | 90 | 60 | 60 | 60 | 60 | 90 |
| Hydrogenation time (minute) | 60 | 60 | 90 | 90 | 90 | 60 |
| Hydrogenation percentage of butadiene units (%) | 98 | 95 | 96 | 97 | 96 | 57 |
| Hydrogenation percentage of styrene units (%) | <1 | <1 | <1 | <1 | <1 | <1 |

Tensile strength, 300% modulus, elongation, tear strength, hardness, compression set, tensile set elongation at break and low-temperature impact brittleness were measured in accordance with JIS K 6301.

Extrudability was tested at 200° C. by the use of a twin-screw extruder of 20 mm in diameter. Weather resistance was measured by keeping a test sheet for 500 hours at 40° C. and 50% R.H. in a weatherometer using carbon electrodes. Heat resistance was measured by keeping a test sheet for 7 hours at 140° C. in an air oven.

Adhesion was measured by mixing 100 parts by weight of a hydrogenated block copolymer with 100 parts by weight of an α-pinene resin (YS RESIN A 1150, manufactured by YASUHARA YUSHI KOGYO CO., LTD.) and 60 parts by weight of an oil (SONIC PROCESS OIL R-200, manufactured by Kyodo Oil Co., Ltd.), dissolving the resulting mixture in toluene, coating the resulting solution on a paper tape, subjecting the coated tape to casting to form a film layer on the paper tape, press-bonding the tape to an aluminum plate, and subjecting the laminate to 180° peeling test.

The measurement results are shown in Table V.

As is obvious from Table V, block copolymers having a hydrogenated polybutadiene block B at the terminals were excellent in rubber elasticity, adhesion, low-temperature characteristics, processability, etc.

TABLE V

| Kind of hydrogenated polymer | | Example 33 Example 11 | Example 34 Example 12 | Example 35 Example 9 |
|---|---|---|---|---|
| Analysis of hydrogenated polymer | Block structure* | B—S—B—S | B—S—B—S—B | S—B—S |
| | Number average molecular weight of each block (× 10$^{-4}$) | 0.8–1.2–2.8–1.2 | 0.6–0.9–3.0–0.9–0.6 | 0.9–4.2–0.9 |
| | Bound styrene content (%) | 40 | 30 | 30 |
| | 1,2-Vinyl content (%) | 36 | 38 | 39 |
| | Content of terminal block B (%) | 13 | 20 | 0 |
| | Proportion of terminal blocks in the total blocks B (%) | 22 | 29 | 0 |
| | Ratio of terminal blocks B to total styrene blocks | 0.33 | 0.67 | 0 |
| | Hydrogenation percentage of butadiene units (%) | 97 | 98 | 99 |
| Physical properties | Tensile strength (kg/cm$^2$) | 350 | 315 | 330 |
| | 300% modulus (kg/cm$^2$) | 62 | 55 | 47 |
| | Elongation (%) | 560 | 650 | 530 |
| | Tear strength (kg/cm) | 49 | 54 | 45 |
| | Hardness (Shore A) | 80 | 69 | 78 |
| | compression set (%) | 76 | 65 | 82 |
| | Tensile Set (%) | 50 | 24 | 52 |
| | Brittle temperature (°C) | <−60 | <−60 | −58 |
| Extrudability | | O | O | O to Δ |
| Weather resistance | | | | |
| Retention of tensile strength (%) | | 108 | 115 | 105 |
| Retention of elongation (%) | | 100 | 101 | 99 |
| Heat resistance | | | | |
| Retention of tensile strength (%) | | 98 | 96 | 95 |
| Retention of elongation (%) | | 103 | 104 | 98 |
| Adhesion (g/cm) | | 310 | 380 | 290 |

*B: Hydrogenated butadiene block
S: Styrene block

EXAMPLES 33 to 35

To each of the three hydrogenated block copolymer solutions obtained in Examples 9, 11 and 12 was added, as a stabilizer, 0.1 phr of bis(2,2,6,6-tetramethyl-4-piperidine) sebacate. Each solution was then subjected to solvent removal to obtain a hydrogenated block copolymer. The copolymer was subjected to pressure molding [100 kg/cm$^2$, 10 minutes, 180° C.] to obtain a sheet of 2 mm in thickness. The physical properties of the sheet were tested.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

EXAMPLES 36 to 37

To each of the hydrogenated block copolymer solution produced in Examples 10 and 13 were added, per 100 parts by weight of hydrogenated block copolymer, 100 parts by weight of a paraffinic oil (DIA PROCESS OIL PW-380, manufactured by Idemitsu Kosan Co., Ltd.) and 5 parts by weight of bis(2,2,6,6-tetramethyl-4-piperidine) sebacate. Each mixture was subjected to solvent removal to obtain an oil-extended polymer composition. 205 Parts by weight of the oil-extended polymer composition was kneaded with 50 parts by weight of a polypropylene (ASAHI POLYPRO M1600, manufactured by ASAHI CHEMICAL INDUSTRY CO., LTD.) and 100 parts by weight of calcium carbonate (WHITON SB, manufactured by SHIRAISHI CALCIUM KAISHA, LTD.), at 180° C. by the use of a twin-screw extruder of 20 mm in diameter to obtain pellets of the hydrogenated block copolymer composition. The pellets were subjected to injection molding at 180° C. to obtain various test pieces for measurement of physical properties. The measurement was conducted in accordance with that in Example 33. The results are summarized in Table VI.

As is obvious from Table VI, the composition of a block copolymer having a hydrogenated polybutadiene block at the terminal was excellent in blanace between strength and elongation as well as in rubber elasticity.

TABLE VI

| | Example 36 | Example 37 |
|---|---|---|
| Kind of hydrogenated polymer | Example 13 | Example 10 |
| Analysis of hydrogenated polymer | | |
| Block structure | B—S—B—S | S—B—S |
| Number average molecular weight of each block ($\times 10^{-4}$) | 1.2–1.8–7.2–1.8 | 1.8–8.4–1.8 |
| Bound styrene content (%) | 30 | 30 |
| 1,2-Vinyl content (%) | 35 | 35 |
| Content of terminal blocks B (%) | 10 | 0 |
| Proportion of terminal blocks B in total blocks B (%) | 14 | 0 |
| Ratio of terminal blocks B to total styrene blocks | 0.33 | 0 |
| Hydrogenation percentage of butadiene units (%) | 99 | 99 |
| Physical properties | | |
| Tensile strength (kg/cm$^2$) | 140 | 100 |
| Tear strength (kg/cm) | 50 | 40 |
| Elongation (%) | 800 | 680 |
| Permanent compression set (%) | 30 | 30 |
| Impact resilience (%) | 44 | 35 |
| Weather resistance | | |
| Retention of tensile strength (%) | 93 | 90 |
| Retention of elongation (%) | 95 | 90 |
| Heat resistance | | |
| Retention of tensile strength (%) | 98 | 94 |
| Retention of elongation (%) | 100 | 95 |

What is claimed is:

1. A process for hydrogenating a diene polymer or copolymer, which comprises contacting said polymer or copolymer having a number average molecular weight of 500 to 1,000,000, in the absence of a hydrocarbon lithium compound, with hydrogen in an inert organic solvent in the presence of at least one of a titanocene diaryl compound having the general formula (I):

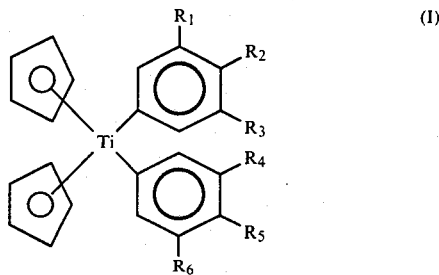

wherein $R_1$ to $R_6$ are independent hydrogen atoms or alkyl groups of 1 to 4 carbon atoms, and at least one of $R_1$ to $R_3$ and at least one of $R_4$ to $R_6$ are alkyl groups and at least one of $R_1$ to $R_3$ and at least one of $R_4$ to $R_6$ are hydrogen atoms, to selectively hydrogenate 50% or more of the unsaturated double bonds of said polymer or copolymer.

2. A process according to claim 1, wherein said titanocene comprises di-p-tolylbis($\eta$-cyclopentadienyl) titanium.

3. A process according to claim 2, wherein the hydrogenation catalyst is present in an amount of from 0.005 to 20 mM per 100 g of said polymer or copolymer.

4. A process according to claim 3, wherein said hydrogenation is conducted at a temperature of 40° to 120° C. and at a pressure of 2 to 30 kg/cm$^2$.

5. A process according to claim 1, wherein said (co)polymer is a (co)polymer composed mainly of 1,3-butadiene and/or isoprene.

6. A process according to claim 1, wherein the copolymer is a block copolymer containing at least one polymer block A composed mainly of styrene and at least one polymer block B composed mainly of 1,3-butadiene and/or isoprene, the content of the blocks A in the block copolymer being 0 to 90% by weight and the 1,2-vinyl content in the blocks B being 20 to 70% by weight.

7. A process according to claim 6, wherein 90% or more of the 1,3-butadiene units and/or the isoprene units and 5% or less of the styrene units are selectively hydrogenated.

8. A process according to claim 6, wherein the block copolymer contains at least two polymer blocks A each having a number average molecular weight of 2,000 to 60,000 and at least two polymer blocks B each having a number average molecular weight of 2,500 to 300,000, at least one of the blocks B being present at the terminal of the copolymer chain, the content of the terminal block B being 3 to 30% by weight based on the weight of the entire copolymer and 4 to 50% by weight based on the weight of the total blocks B, the weight ratio of the terminal block B to the total blocks A being 0.1 to 1.0, and the 1,2-vinyl content in the blocks B being 20 to 50% by weight.

9. A process according to claim 8, wherein 90% or more of the 1,3-butadiene units and/or the isoprene units and 5% or less of the styrene units are selectively hydrogenated.

* * * * *